United States Patent [19]
Hudson

[11] Patent Number: 5,511,582
[45] Date of Patent: Apr. 30, 1996

[54] COMPENSATING VALVE FOR CONTROL OF FLUID FLOW

[75] Inventor: Dannie B. Hudson, Jacksonville, Fla.

[73] Assignee: ENRJ Ltd., Freeport, Bahamas

[21] Appl. No.: 447,769

[22] Filed: May 23, 1995

[51] Int. Cl.[6] ............................................. F16K 31/363
[52] U.S. Cl. ............................................ 137/494; 251/63.6
[58] Field of Search ................................ 137/494, 505; 251/63.6

[56] References Cited

U.S. PATENT DOCUMENTS

| | | | |
|---|---|---|---|
| 1,959,909 | 5/1934 | Farmer | 137/494 |
| 2,597,582 | 5/1952 | Gruss | 137/494 X |
| 3,792,714 | 2/1974 | Miller | 137/494 |
| 3,933,338 | 1/1976 | Herd et al. | 251/63.6 |
| 4,634,099 | 1/1987 | Danko et al. | 251/63.6 X |
| 4,827,963 | 5/1989 | Baker et al. | 251/63.6 X |
| 5,218,991 | 6/1993 | Gray | 137/505.14 X |

FOREIGN PATENT DOCUMENTS

| | | | |
|---|---|---|---|
| 506769 | 12/1954 | Italy | 137/494 |
| 244833 | 10/1969 | U.S.S.R. | 137/494 |

*Primary Examiner*—Stephen M. Hepperle
*Attorney, Agent, or Firm*—Thomas C. Saitta

[57] ABSTRACT

A hydraulically operated adjustable valve for controlling fluid flow through an orifice directly responsive to changes in pressure monitored either upstream or downstream of the valve, suitable for use in high pressure regimes, where said valve is controlled by a piston having a main body, a shoulder and an extension, where hydraulic fluid within a hydraulic bore acts upon said extension to extend said piston, and where a biasing spring acts on the main body in combination with pressurized air within a lower air chamber air acting upon said shoulder to retract said piston. An apertured valve barrier allows the valve to compensate for pressure changes in a high pressure regime upstream of the valve.

10 Claims, 2 Drawing Sheets

COMPENSATING VALVE FOR CONTROL OF FLUID FLOW

BACKGROUND OF THE INVENTION

The invention relates generally to valves which control fluid flow through an orifice and are responsive to pressure conditions. More particularly, the invention relates to such valves which are fluidly connected to reservoirs or conduits of fluid which are to be maintained at a steady state pressure, whereby the operating mechanism of the valve is directly connected to the fluid reservoir and acts in response to pressure changes in the fluid reservoir. Even more particularly, the invention relates to such valves which are operated by hydraulic fluid acting on a piston, the piston and hydraulic oil connection being sealed by O-rings to allow for extended travel and the piston casing containing a conduit for high pressure air to be applied to the opposing side of the piston to move the piston against the pressure of the hydraulic fluid. Valves of this general type are known as compensating valves, where the valve acts to reduce or increase flow of fluid into or out of the fluid reservoir or conduit through an opening in response to changes in the pressure of the fluid in the fluid reservoir or conduit.

A compensating valve of a type similar to the present invention is disclosed in my U.S. Pat. No. 4,493,558, issued Jan. 15, 1985, wherein a compensating valve system which controls an adjustable homogenization orifice is shown. A homogenization orifice acts to homogenize two insoluble liquids through shear layer and cavitation effects such that they will remain mixed for a suitable period before separation. Shearing effects are the result of fluid flow past a solid object, which creates turbulence in the flow stream. Shear effects occur at low flow rate or pressure, and the degree of mixing of two liquids in the flow is limited. Cavitation is the formation of vapor or gas filled cavities in liquids by mechanical forces. More precisely, it is the formation of vapor filled cavities in the interior or on the solid boundaries of vaporizable liquids in motion when the pressure is reduced to a critical value without change in ambient temperature. In pipelines cavitation is a result of the combination of high flow rate and pressure drop from high to low. Cavitation also occurs in turbines, pumps and propellers. In many circumstances cavitation is to be avoided, as it lowers the efficiency of equipment, produces noise and vibration, and causes rapid erosion of boundary surfaces. On the other hand, cavitation can be very useful in producing homogeneous mixtures of insoluble liquids and solids in other liquids, as well as being a means to reduce particle size.

One application where shear effects and cavitation have been applied with positive effect is in the area of homogenization of fuel oil and water mixtures. It is known that effective intermixing of additional components such as fresh water into a fuel oil stream which is subsequently burned to operate a combustion system, such as a boiler or internal combustion engine, is advantageous with regard to reducing fuel consumption corrosion, particulate emissions and other pollutants, and soot build-up. As taught for example in U.S. Pat. No. 4,127,332, a stream of fuel oil is passed through a relatively small orifice at high velocity to create a cavitating free turbulent velocity shear layer, and water is added at the orifice exit, otherwise known as the base of cavitation, resulting in a homogenized mixture or colloidal suspension of the two components with long term stability and lack of separation. The cavitation creates a flow regime at the orifice exit where vapor bubbles form, expand, contract and violently collapse. The resulting high pressure shock waves produce excellent intermixing of the components.

The pressure differential between the pressure of the upstream fluid prior to passage through the cavitating orifice and pressure of the fluid downstream of the cavitating orifice is critical for optimum mixing. For a fuel oil/water mixture, a pressure differential of 10:1 is preferred. This means that, for example, fuel oil having a pressure of 300 psig on the inlet side of the cavitating orifice should be maintained at 30 psig on the outlet side of the orifice. However, changes in various factors such as volume, viscosity, upstream pressure, downstream pressure and fuel temperature will alter this pressure differential ratio in an active system. It is therefore necessary to monitor the active system and make adjustments to compensate for the changes to maintain the proper pressure differential, as preferred tolerances are in the plus or minus 2 psig range.

One known way to monitor and control an active flow system is through the use of a compensating valve, as shown for example in my U.S. Pat. No. 4,493,558, which is coupled with a pressure sensing means monitoring the low pressure side of the cavitating orifice. The compensating valve has a solid sliding barrier adjacent a fixed orifice, such that the barrier is moved responsive to changes in pressure in the downstream region to either increase the effective opening size by exposing more of the orifice, thereby increasing flow and raising pressure in the downstream region, or to decrease the effective opening size by blocking more of the orifice, thereby decreasing flow and decreasing the pressure in the downstream region. The pressure sensing means communicates directly with the compensating valve by hydraulic fluid, such that an increase in pressure in the downstream region forces hydraulic fluid against the reciprocating piston of the compensating valve, extending the sliding barrier relative to the fixed orifice to decrease the opening size. A decrease in downstream pressure results in opposite movement of the piston, whereby the barrier is retracted and blocks less of the opening. The use of hydraulically controlled valves, as opposed to pneumatically or electronically controlled valves, is preferred because the response time is much better.

This structure works well with systems in which the low pressure side is monitored, since the required movement of the solid barrier relative to the opening is directly responsive to the change in pressure, i.e., an increase in pressure causes the solid barrier to block more of the opening and a decrease in pressure causes the solid barrier to block less of the opening. This construction however is useless in flow situations where the upstream high pressure region needs to be monitored, and the compensating valve and homogenization orifice must adjust inversely to the change in pressure, i.e., where an increase in pressure and force against the piston of the compensating valve must result in a larger effective opening size in order to decrease upstream pressure, and a decrease in upstream pressure must result in a smaller effective opening size to increase effective opening size.

It is desirable in certain applications to have a piston type valve directly responsive to fluctuations in pressure in a fluid reservoir or conduit which is constructed to be utilized with very high pressures and where the travel of the piston within the compensating valve is not restricted to a small distance. It is an object of this invention therefore, to provide such a valve which can be operative in conjunction with fluid reservoirs or conduits having pressures up to about 2000 psi. It is a further object of this invention to provide such a valve in which the hydraulic fluid is sealed in the piston head cavity by the use of O-rings, in order to allow greater travel of the piston. It is a still further object to provide such a valve which comprises means in addition to the biasing spring to apply pressure against the pressure of the hydraulic fluid in order to reciprocate the piston, such means preferably being pressurized air introduced by a conduit through the piston casing to the underside of the piston head. It is another object to provide a valve suitably adapted to be utilized as part of a compensating valve system, and even more particularly as part of a compensating valve system having an adjustable homogenization orifice for mixing liquids, where the size of the homogenization orifice is adjusted in response to fluid pressure in a fluid reservoir or conduit. It is a still further object to provide a valve system where monitored pressure can be on either the high pressure or low pressure said of the homogenization orifice.

SUMMARY OF THE INVENTION

The invention is a valve responsive to fluid pressure in a fluid reservoir or conduit, where the valve is in direct fluid communication with the reservoir or conduit. The valve comprises in general an external casing, frame and valve body to contain and support the moving components of the valve assembly. The casing comprises an upper and lower component which in conjunction define an internal hydraulic fluid bore and an atmospheric bore to receive a reciprocating piston connected to a piston rod which in turn is connected to a valve stem which extends into a radial bore in the valve body. The upper casing has a fluid communication port which is connected to a conduit containing hydraulic fluid which directly communicates through pressure gauging means with the reservoir being monitored. The valve stem connects to a sliding valve barrier which opens or closes the flow orifice in the valve body. A biasing spring surrounds the piston rod on the opposite side of the piston from the hydraulic fluid to provide force in the direction opposite to the force supplied by the hydraulic fluid. The piston has a large cylindrical main body which corresponds to the internal bore of the casings and a smaller cylindrical extension which corresponds with and fits into the cylindrical hydraulic fluid bore in the upper casing. An O-ring surrounding the piston extension seals the hydraulic fluid bore from the internal atmospheric bore. An air inlet port in the lower casing is connected to a source of pressurized air and communicates to the bottom of the internal atmospheric bore. The piston has an O-ring mounted in an annular channel on the exterior of the large cylindrical main body, which sealingly separates the atmosphere in the internal atmosphere bore below the piston from the atmosphere in the internal atmosphere bore above the piston. An additional O-ring mounted in an annular channel surrounding the lower portion of the piston prevents loss of the pressurized air through the gap between the piston and the internal wall of the lower casing.

In application, the hydraulic fluid bore of the upper casing is in direct fluid communication through pressure gauging or sensing means with a fluid containing reservoir or conduit, such that an increase in pressure in that reservoir causes force to be applied by the hydraulic fluid to the cylindrical extension of the piston, which in turn forces the piston down into the bottom of the hydraulic fluid bore and the internal atmospheric bore. The biasing spring is compressed and the valve stem is extended into the valve body, thereby moving the slide valve barrier relative to the opening to control the flow of liquid through the orifice. A decrease in pressure within the fluid reservoir allows the biasing spring to force the piston back toward the top of the internal bore and the hydraulic fluid bore, thereby withdrawing the valve stem and moving the valve barrier relative to the orifice to affect the liquid flow in opposite manner. In applications where the pressure in the fluid reservoir is relatively high, typically greater than about 450 psig, the biasing spring would have to be greatly enlarged to provide sufficient force to counteract the pressure of the hydraulic fluid against the piston when the pressure in the reservoir decreases. An enlarged spring is less susceptible to fine adjustments. In the present device, rather than substitute an enlarged spring, the piston is raised by a standard biasing spring in conjunction with the application of high pressure air up to about 125 psi through the air inlet port into the bottom of the internal atmosphere bore.

One embodiment of the device is particularly suitable for application to monitoring a high pressure reservoir or conduit upstream of the valve, where the valve is a compensating valve used to stabilize the pressure within the high pressure reservoir. In situations where the compensating valve monitors the low pressure side downstream of the valve, the sliding barrier valve is a solid body which is inserted into the flow opening to decrease its size in response to an increase in downstream pressure, thereby decreasing the liquid flow. In response to a decrease in downstream pressure, the solid barrier valve is withdrawn to increase the size of the flow opening, thereby increasing the flow. Where the high pressure reservoir or conduit is upstream of the valve, an increase in pressure must increase the size of the flow opening to compensate by increasing the flow, and a decrease in pressure must decrease the size of the flow opening to compensate by restricting the flow. While different designs for a solid valve barrier and opening with relatively complicated mechanisms may be used to accomplish this in a valve system directly responsive to changes in pressure, the particular construction of the valve barrier when the valve is used as a homogenization orifice is severely restricted, since the orifice must have sharply defined edges and corners to provide maximum homogenization. To accomplish the proper compensation adjustment in a compensating valve system directly responsive to changes in pressure upstream of the valve, an apertured valve barrier is provided which increases the size of the flow opening when moved into the flow opening and decreases the size of the flow opening when withdrawn, the valve barrier preferably incorporating a rectangular central aperture.

DETAILED DESCRIPTION OF THE INVENTION

Figure 1:
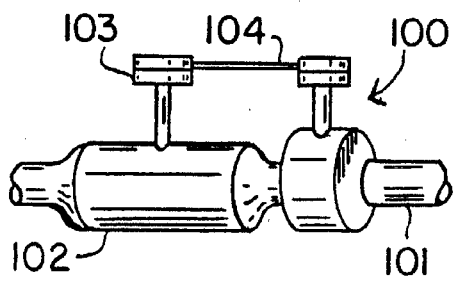
FIG. 1 is a general view of the invention as incorporated in a liquid flow conduit.
Figure 3:
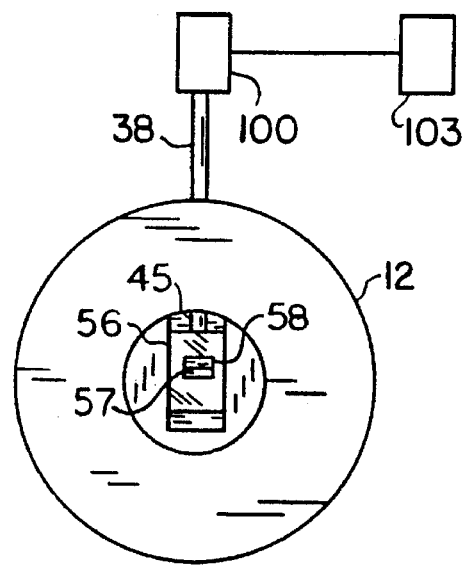
FIG. 3 is a view in the direction of flow of the apertured barrier.

With reference to the drawings, the invention will now be described in with regard to the best mode and preferred embodiment. As shown in FIG. 1, the invention comprises in general a compensating valve 100 which is adapted to be incorporated into a fluid flow system having a first conduit 101 adjacent the valve 100 and a fluid reservoir or second conduit 102 adjacent the opposite side of valve 100, where the compensating valve 100 controls flow in response to pressure changes sensed in the reservoir or second conduit 102 by pressure gauging or sensing means 103 which communicates directly with valve 100 by a hydraulic fluid conduit 104. The flow direction of the system shown in FIG. 1 can be in either direction, such that first conduit 101 can be either an inlet or outlet conduit. Where first conduit 101 is an inlet conduit, then pressure sensing means 103 monitors pressure changes downstream of valve 100 and fluid flow into reservoir 102 is controlled by valve 100. Where first conduit 101 is an outlet conduit, then pressure sensing means 103 monitors pressure changes upstream of valve 100 and fluid flow out of reservoir 102 is controlled by valve 100.

Figure 2:
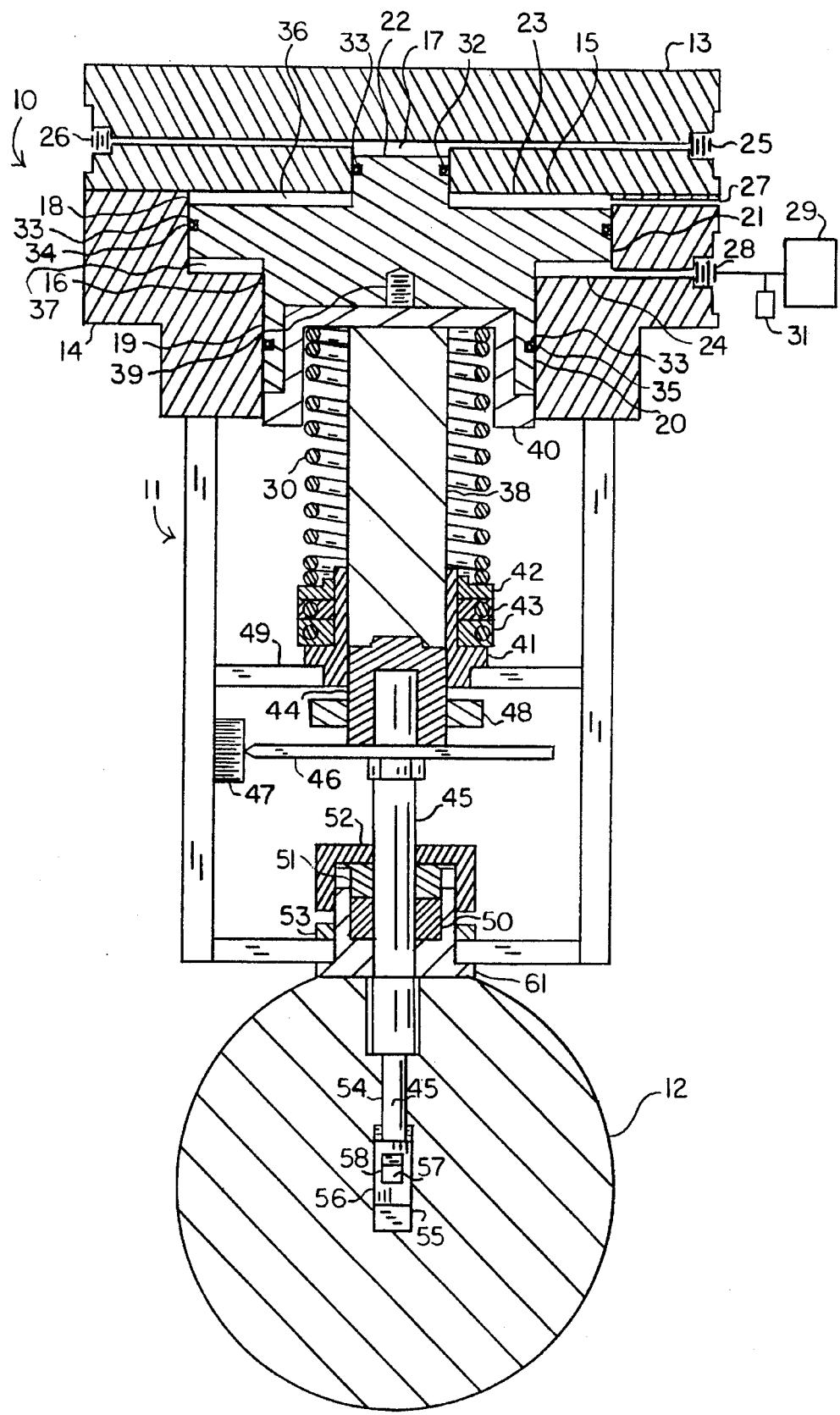
FIG. 2 is a cross-sectional view of the invention.

With reference now in particular to FIG. 2, the compensating valve 100 itself and its operation will now be described in greater detail. Reference will be made to upper and lower directions or top and bottom elements corresponding to the orientation shown in FIG. 2, but it is to be understood that such orientation is arbitrary and the terminology is used for ease of explanation only. The valve 100 can be divided into three main external segments, the casing 10, the frame 11 and the valve body 12. The casing 10 retains the piston 16 and as shown is comprised of an upper casing 13 and lower casing 14 which are adapted to join to form a piston receiving bore 15 defining an internal open area which allows reciprocal travel of the piston 16 therein. The piston receiving bore 15 is comprised of three compartments, a hydraulic fluid bore 17, an atmospheric bore 18 and a sleeve bore 19, each being preferably cylindrical in configuration and having a common central axis. The diameter of hydraulic fluid bore 17 is preferably much smaller than the diameter of atmospheric bore 18, with the diameter of the sleeve bore 19 being sized preferably in between that of the hydraulic fluid bore 17 and atmospheric bore 18. Sleeve bore 19 opens externally through the lower casing 14. Piston 16 is comprised of three main segments, the piston main body 20, the piston shoulder 21 and the piston extension 22. The piston main body 20 is sized and configured to correspond to the size and configuration of the sleeve bore 19, being cylindrical to match the cylindrical sleeve bore 19, with the diameter of the piston main body 20 being slightly smaller than the diameter of the sleeve bore 19 to allow for reciprocal travel along the direction of the central axis. The piston shoulder 21 is also cylindrical to correspond to the cylindrical atmospheric bore 18, with the diameter of piston shoulder 21 being slightly less than the diameter of the atmospheric bore 18 to allow axial travel. Because atmospheric bore 18 is larger than either hydraulic fluid bore 17 or sleeve bore 19, it defines an upper piston stop 23 and lower piston stop 24 which limit travel of the piston 16 in the axial direction, upper piston stop 23 being formed by a lower surface of upper casing 13 and lower piston stop 24 being formed by an upper surface of lower casing 14. The height of piston shoulder 21 is less than the distance between upper piston stop 23 and lower piston stop 24 to allow reciprocal travel of piston 16 within the piston receiving bore 15. Piston extension 22 is cylindrical and extends upward from piston shoulder 21 to correspond to hydraulic fluid bore 17, the diameter of piston extension 22 being slightly less than the diameter of hydraulic fluid bore 17 and likewise capable of movement in the axial direction.

Connecting to hydraulic fluid bore 17 are a hydraulic fluid port 25 and a hydraulic fluid purge port 26, which is closed and sealed during normal operations. Hydraulic fluid port 25 communicates with and receives hydraulic fluid from the hydraulic fluid conduit 104 of the pressure gauging means 103. Hydraulic fluid port 25 accesses hydraulic fluid bore 17 through or adjacent its upper surface, such that hydraulic fluid can be delivered against the top of the piston extension 22 even when the piston 16 is in the fully retracted or upper position. An air vent port 27 connects the upper portion or top of the atmospheric bore 18 to atmosphere. Air vent port 27 is unsealed and allows escape of air from atmospheric bore 18 during the retracting or upstroke of piston 16 as the upper surface of piston shoulder 21 approaches the upper piston stop 23, as well as allowing for intake of air to prevent creation of a vacuum during the extension or downstroke of piston 16 as the upper surface of piston shoulder 21 draws away from the upper piston stop 23. An air inlet port 28 accesses the atmospheric bore 18 through or adjacent its lower surface and is a conduit connecting the atmospheric bore 18 to a source of pressurized air, shown generally as air supply means 29 in the drawing, which can be any of the known mechanisms for supplying air at pressures up to 125 psi. Air supply means 29 provides pressurized air through air inlet port 28 to the bottom of piston shoulder 21 to provide assisting force, in conjunction with the biasing spring 30, to counteract the pressure of the hydraulic fluid in the hydraulic fluid bore 17 to retract or raise the piston 16 in the upstroke. An air pressure relief valve 31 is incorporated in the air supply means 29 or air inlet port 28 to release air to atmosphere from beneath the piston shoulder 21 when the piston 16 is extended on the downstroke and the bottom of piston shoulder 21 approaches the lower piston stop 24.

Three O-rings are positioned in three annular channels on the piston 16 to create three sealed compartments in the piston receiving bore 15. A hydraulic fluid bore O-ring 32 is positioned in a first annular channel 33 near the top of piston extension 22 to provide an annular seal between the piston extension 22 and the cylindrical wall of hydraulic fluid bore 17 to seal the hydraulic fluid within the hydraulic fluid bore 17 and to separate the hydraulic bore 17 from the atmospheric bore 18, such that piston extension 22 can reciprocate axially within hydraulic fluid bore 17 without hydraulic fluid entering the atmospheric bore 18. An atmospheric bore O-ring 34 is positioned in a second annular channel 33 on piston shoulder 21 to provide an annular seal between the upper portion of the atmospheric bore 18 and the lower portion of the atmospheric bore 18, such that air on one side of piston shoulder 21 cannot pass to the opposite side of piston shoulder 21. This atmospheric bore O-ring 34 thus divides the atmospheric bore 18 into an upper air chamber 36 and a lower air chamber 37, upper air chamber 36 being defined by the upper piston stop 23, the annular walls of the atmospheric bore 18 and the upper surface of the piston shoulder 21, and lower air chamber 37 being defined by the lower piston stop 24, the annular walls of the atmospheric bore 18 and the lower surface of the piston shoulder 21. Finally, a sleeve bore O-ring 35 is positioned in a third annular channel 33 on the lower portion of the piston main body to provide an annular seal between the lower air chamber 37 and the atmosphere. Because of the hydraulic fluid bore O-ring 32, the only inlet and outlet for the hydraulic fluid is through the hydraulic fluid port 25 or the purge port 26. The only inlet and outlet for air into or out of the upper air chamber 36 is through the air vent port 27 because of the hydraulic fluid bore O-ring 32 and the atmospheric bore O-ring 34. The only inlet and outlet for air into or out of the lower air chamber 37 is through the air inlet port 28 because of the atmospheric bore O-ring 34 and the sleeve bore O-ring 35.

To provide a countering force to the pressure of the hydraulic fluid in order to retract the piston 16 on the upstroke, a biasing spring 30 is mounted within frame 11 around piston rod 38, which connects to piston 16 by any suitable connecting means, such as threaded piston rod connector 39. The biasing spring 30 is sized to provide sufficient force to raise the piston 16 and displace the hydraulic fluid from hydraulic fluid bore 17 either alone, for low hydraulic fluid pressures, or in conjunction with force supplied by the pressurized air supply means 29, for situations where the hydraulic fluid is under high pressure. The biasing spring 30 is mounted between a spring retainer collar 40 on the underside of piston 16 and a spring mount 41 adjoined to frame 11, with spring retainer ring 42 and one or more spring lock nuts 43 securing the biasing spring 40 and providing means to adjust the force of biasing spring 40 against piston 16. A piston stem 44 connects the valve stem 45 to the piston rod 38, and a position indicator 46 can be located on any reciprocating member to indicate the valve position on a stationary indicator scale 47. A manually operated lower lock nut 48 is positioned on the underside of the horizontal support member 49 to manually position the compensating valve 100 to permit repairs to the hydraulic section during operation of the system.

The valve stem 45 extends through frame 11 into valve body 12 within a packing gland 61 containing packing material 50 retained by a bushing 51 and gland nut 52. A gland lock nut 53 secures the packing gland 61 to the frame 11. The valve body 12 is a large housing adapted to be connected into a fluid flow system, as shown in FIG. 1, and may comprise generally cylindrical mounting flanges with inlet and outlet openings on opposite ends providing fluid access to a centrally located valve chamber 55 containing a flow orifice 57. The size of the flow orifice 57 for optimum homogenization is a function of flow rate. For example, a flow rate of less than 30 gpm preferably utilizes an orifice 57 sized ¼ inches by ⅜ inches, a flow rate of 30–60 gpm utilizes an orifice 57 ⅜ inches by ⅜ inches, a flow rate of 60–125 gpm one ⅜ inches by ¾ inches, a flow rate of 125–700 gpm one 1 and ¼ inches by 1 and ¼ inches, and a flow rate of 700–1000 gpm one of 1 and ¼ inches by 1 and ¾ inches. The edges of the orifice 57 should be very precise to maximize cavitation effects, with a preferred radius on the edge of less than 2/1000 inches. A radial bore 54 extends from the perimeter toward the center of the valve body 12 to the valve chamber 55, and valve stem 45 extends into this radial bore 54 and connects to a sliding valve barrier 56 which reciprocates within the valve chamber 55 in response to movement of the piston 16. The valve barrier 56 partially blocks the flow of fluid through the orifice 57 in the valve chamber 55, such that the movement of the valve barrier 56 relative to the orifice 57 acts to either increase or decrease the size of the orifice 57 to increase or decrease the flow of fluid through the orifice 57, thereby raising or reducing the pressure in reservoir 101 or 102 adjacent the compensating valve 100. The compensating valve 100 can adjust the size of orifice 57 by moving the valve barrier 56 as little as one thousandth of an inch, or can move the valve barrier 56 the full allowed travel distance of the piston 16.

In operation, the preferred pressure for the fluid in the reservoir 101 or 102 is determined, which can be either upstream pressure or downstream pressure of compensating valve 100. Fluid flow is initiated through the fluid flow system and the position of the valve barrier 56 of the compensating valve 100 for proper sizing of the orifice 57 to produce the correct flow through the orifice 57 to produce the proper pressure in the reservoir 101 or 102 is determined by adjustment of the biasing spring 30. The pressure sensing means 103 then monitors the pressure in the reservoir 101 or 102. Any increase in pressure in the reservoir 101 or 102 is hydraulically communicated to the compensating valve by hydraulic fluid conduit 104, the increase in pressure forcing hydraulic fluid through hydraulic fluid port 25 and against the upper surface of piston extension 22, which forces the piston 16 downward, expelling air from the lower air chamber 37 out the air pressure relief valve 31 and drawing air into the upper air chamber 36 through air vent port 27. The valve stem 45 and the valve barrier 56 are extended into the valve chamber 55. Any decrease in pressure in the reservoir 101 or 102 causes hydraulic fluid to be drawn from the hydraulic fluid bore 17 back into hydraulic fluid conduit 104, and the piston 16 is retracted into the casing 10 by the upward pressure exerted by the biasing spring 30, which retracts the valve stem 45 and valve barrier 56 relative to the valve chamber 55. In circumstances where the hydraulic fluid is under high pressure, for example greater than 450 psi, a reasonably sized biasing spring 30 would not be able to overcome this pressure and raise the piston 16, so additional pressure is supplied against the underside of piston shoulder 21 by air from the pressurized air supply means 29. This allows the compensating valve 100 to be utilized in systems with fluid pressures of up to 2000 psi in the reservoir 101 or 102. The use of O-rings in place of a diaphragm and the presence of the large diameter piston shoulder 21 also allows the compensating valve 100 to be used in high pressure systems without the need to provide pressure below the piston equal to the pressure of the hydraulic fluid above the piston.

Figure 4:
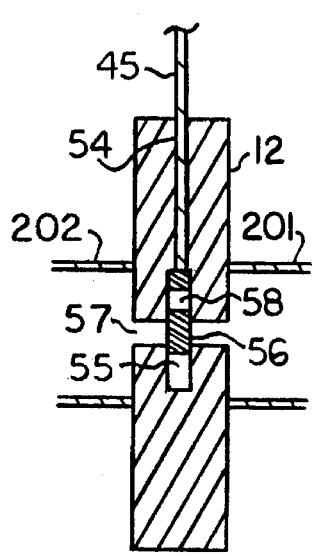
FIG. 4 is a cross-sectional view of the apertured barrier in the fully closed position.
Figure 5:
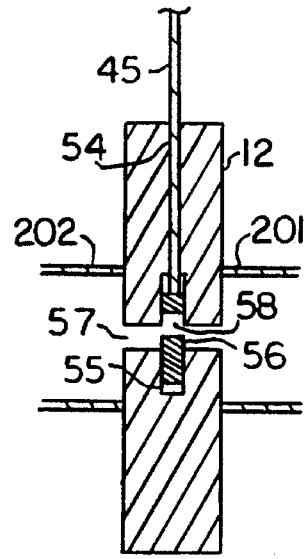
FIG. 5 is a cross-sectional view of the apertured barrier in the partially opened position.
Figure 6:
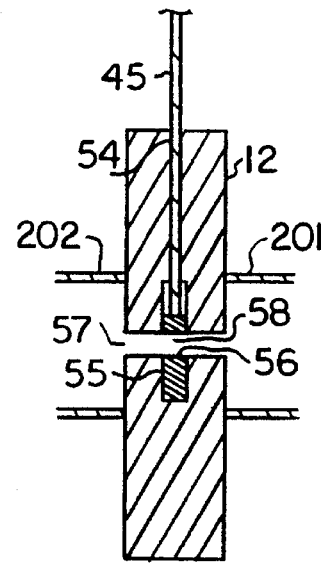
FIG. 6 is a cross-sectional view of the apertured barrier in the fully open position.

In a system where the low pressure regime downstream of the compensating valve 100 is monitored, the sliding barrier valve 56 is preferably a solid member. An increase in downstream pressure is sensed by pressure sensing means 103, resulting in direct hydraulic pressure on piston 16, which in turn extends barrier valve 56 over a portion of the flow orifice 57, blocking fluid flow by decreasing the effective opening size of orifice 57, thereby lowering the pressure downstream back to the preferred value. Likewise, any decrease in downstream pressure results in retraction of barrier valve 56, increasing the effective opening size of orifice 57 and increasing pressure back to the preferred value. This process is automatic and instantaneous, whereby a preferred pressure value within plus or minus 2 psig can be easily maintained. In a system where the high pressure upstream of the compensating valve 100 is monitored by pressure sensing means 103, the flow compensation through compensating valve 100 is the inverse of that described above, in that an increase in the upstream pressure must result in an increase in fluid flow and a decrease in upstream pressure must result in a decrease in fluid flow to maintain a constant pressure. To accomplish this with a directly responsive compensating valve 100, the barrier valve 56 must be apertured, as shown in FIGS. 3, 4, 5 and 6. Here the reciprocating barrier valve 56 contains a barrier orifice 58 which allows fluid flow through the barrier valve 56 itself. For example, there are system applications where it is beneficial to provide a high pressure reservoir 201 upstream of the compensating valve 100 with pressures in the range of 500 to 2000 psig maintained at tolerances of a few psig, with a pressure downstream of the compensating valve 100 in a low pressure conduit 202 in the range of 100 to 600 psig. As shown in FIG. 4, the flow orifice 57 is completely closed when the barrier orifice 58 is retracted such that there is no overlap of either opening. Since the flow path is sealed, pressure will build in the upstream reservoir 201 to the critical value and slightly above, at which time the pressure sensing means 103 will hydraulically communicate this increase directly to piston 16, thereby extending barrier valve 56 such that the barrier opening 58 partially overlaps flow orifice 57, which allows fluid flow through the compensating valve 100 and into low pressure conduit 202, as shown in FIG. 5. Once an equilibrium flow is established, the barrier valve reacts to either increases or decreases in pressure in the high pressure reservoir 201. Any increase in pressure above the desired value results in further extension of the barrier valve 56, as shown in FIG. 6, increasing the effective opening size of flow orifice 57 and increasing flow to reduce pressure in the high pressure reservoir 201. Any decrease in pressure in the high pressure reservoir 201 results in a retraction of the barrier valve 56, decreasing the effective opening size of the flow orifice 57 and decreasing flow to raise pressure in the high pressure reservoir 201. This compensation for variations in pressure in the high pressure reservoir 201 allows a stable pressure to be maintained in the downstream low pressure conduit 202.

It is understood that equivalents and substitutions may be obvious to those skilled in the art, and the true scope and definition of the invention therefore is to be as set forth in the following claims.

I claim:

1. A hydraulically operated adjustable valve device for controlling fluid flow through an orifice, said device comprising a valve body, a casing enclosing a cylindrical piston, and a frame connecting said casing to said valve body;
   (A) said valve body comprising a flow orifice abutted by a sliding valve barrier, said sliding valve barrier being operatively connected to said piston;
   (B) said piston comprising a main body, a shoulder and an extension, said extension and said main body each having a smaller diameter than said shoulder;
   (C) said casing comprising a hydraulic fluid bore adapted to reciprocatingly receive said piston extension, an atmospheric bore adapted to reciprocatingly receive said piston shoulder, and a sleeve bore adapted to reciprocatingly receive said piston main body; said atmospheric bore and said piston shoulder defining in combination an upper air chamber and a lower air chamber; a hydraulic fluid port communicating with said hydraulic bore, an air vent communicating with said upper air chamber, and an air inlet port communicating with said lower air chamber;
   (D) said piston extension having an O-ring annularly mounted thereon to separate said hydraulic bore from said atmospheric bore; said piston shoulder having an O-ring annularly mounted thereon to separate said upper air chamber from said lower air chamber;
   (E) said frame supporting a biasing spring to supply force against said piston;
   whereby when hydraulic fluid is supplied at increased pressure through said hydraulic port into said hydraulic bore and against said piston extension, increasing the size of said upper air chamber, decreasing the size of said lower air chamber and extending said valve barrier relative to said fixed flow orifice; and whereby when said hydraulic fluid pressure is decreased within said hydraulic bore, said biasing spring reciprocates said piston in the opposite direction, increasing the size of said lower air chamber, decreasing the size of said upper air chamber and retracting said valve barrier relative to said fixed flow orifice.

2. The device of claim 1, further comprising a pressurized air supply means communicatingly connected to said air inlet port, whereby pressurized air can be supplied into said lower air chamber to assist said biasing spring in moving said piston.

3. The device of claim 2, further comprising an air pressure relief valve communicatingly connected to said air vent to allow release of air from said lower air chamber.

4. The device of claim 1, further comprising first and second fluid conduits communicatingly connected to said valve body, and pressure gauging means to sense the fluid pressure in either said first or said second conduit and to hydraulically communicate changes in said fluid pressure to said hydraulic fluid port to move said piston.

5. The device of claim 1, where said sliding barrier is apertured.

6. The device of claim 4, where said sliding barrier is apertured and said pressure gauging means senses pressure upstream of said valve body.

7. A compensating valve device for control of fluid flow through an orifice comprising:
   (A) a piston directly responsive to fluid pressure changes upstream of said compensating valve device, whereby an increase in upstream pressure causes said piston to extend and a decrease in upstream pressure causes said piston to retract, said piston operatively connected to a sliding valve barrier having an aperture;
   (B) a valve body containing a valve chamber communicating with a flow orifice, said valve chamber adapted to receive said apertured sliding valve barrier such that said aperture can be aligned with said flow orifice to create a flow path for fluid, the effective opening size of said flow path being adjustable according to the position of said aperture of said sliding valve barrier relative to said flow orifice, whereby said aperture and said orifice are aligned such that retraction of said piston decreases said effective opening size and extension of said piston increases said effective opening size,
   (C) said piston further comprising a main body, a shoulder and an extension, said extension and said main body each having a smaller diameter than said shoulder;
   (D) a casing comprising a hydraulic fluid bore adapted to reciprocatingly receive said piston extension, an atmospheric bore adapted to reciprocatingly receive said piston shoulder, and a sleeve bore adapted to reciprocatingly receive said piston main body; said atmospheric bore and said piston shoulder defining in combination an upper air chamber and a lower air chamber; a hydraulic fluid port communicating with said hydraulic bore, an air vent communicating with said upper air chamber, and an air inlet port communicating with said lower air chamber;
   (E) said piston extension having an O-ring annularly mounted thereon to separate said hydraulic bore from said atmospheric bore; said piston shoulder having an O-ring annularly mounted thereon to separate said upper air chamber from said lower air chamber; and
   (F) a frame supporting a biasing spring to supply force against said piston;
   whereby when hydraulic fluid is supplied at increased pressure through said hydraulic port into said hydraulic bore and against said piston extension, increasing the size of said upper air chamber, decreasing the size of said lower air chamber and extending said valve barrier relative to said fixed flow orifice; and whereby when said hydraulic fluid pressure is decreased within said hydraulic bore, said biasing spring reciprocates said piston in the opposite direction, increasing the size of said lower air chamber, decreasing the size of said upper air chamber and retracting said valve barrier relative to said fixed flow orifice.

8. The device of claim 7, further comprising a pressurized air supply means communicatingly connected to said air inlet port, whereby pressurized air can be supplied into said lower air chamber to assist said biasing spring in moving said piston.

9. The device of claim 8, further comprising an air pressure relief valve communicatingly connected to said air vent to allow release of air from said lower air chamber.

10. The device of claim 7, further comprising first and second fluid conduits communicatingly connected to said valve body, and pressure gauging means to sense the fluid pressure in either said first or said second conduit and to hydraulically communicate changes in said fluid pressure to said hydraulic fluid port to move said piston.

\* \* \* \* \*